Sept. 15, 1959    F. H. CHASE    2,904,742
CURRENT SUPPLY APPARATUS
Filed Sept. 16, 1957
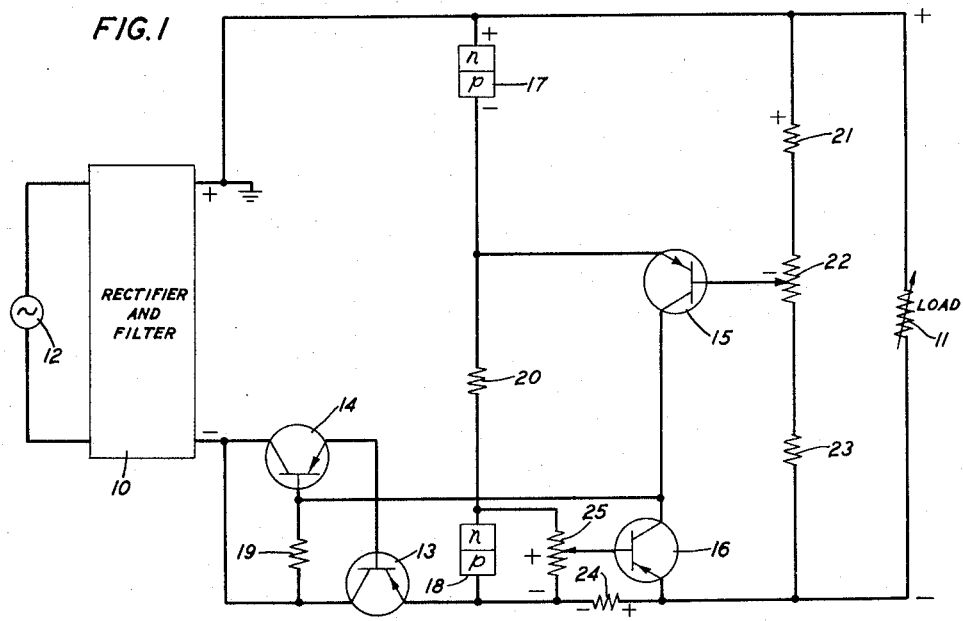
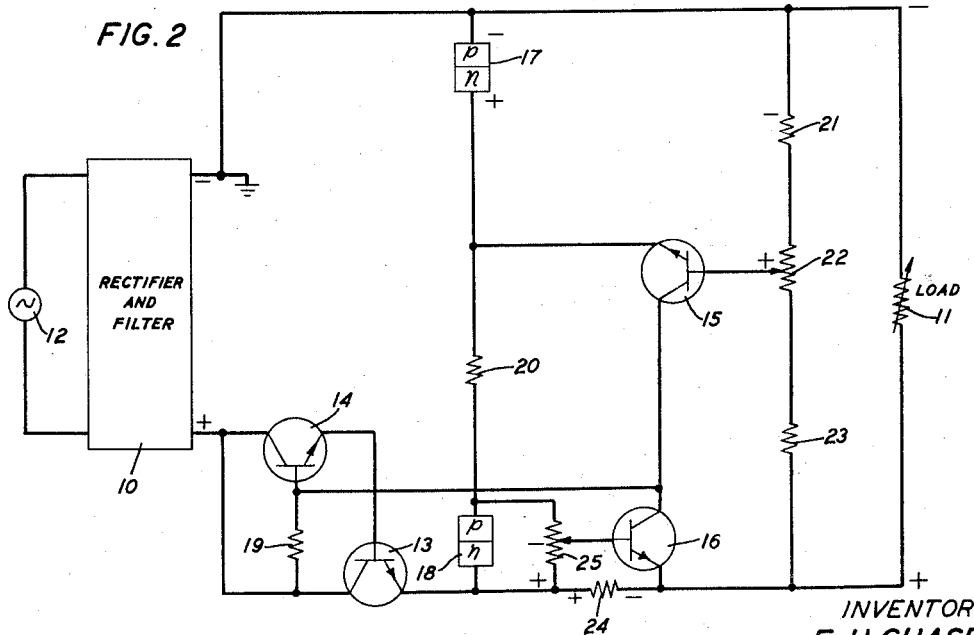
INVENTOR
F.H. CHASE
BY
G. F. Heuerman
ATTORNEY United States Patent Office 2,904,742
Patented Sept. 15, 1959

2,904,742
CURRENT SUPPLY APPARATUS

Fay H. Chase, Short Hills, N.J., assignor to Bell Telephone Laboratories, Incorporated, New York, N.Y., a corporation of New York Application September 16, 1957, Serial No. 684,040

4 Claims. (Cl. 323—22)

This invention relates to current supply apparatus and more particularly to apparatus for regulating the supply of current from a current supply source to a load.

An object of the invention is to provide an improved current supply circuit for minimizing load voltage changes over a normal operating range of load current and for limiting the load current when it exceeds the normal operating range of load current.

The invention is an improvement in certain respects over the current supply apparatus disclosed in applicant's copending application Serial No. 525,895, filed August 2, 1955.

In a specific embodiment of the invention herein shown and described for the purpose of illustration, current is supplied from a direct-current supply source to a load through a load circuit comprising the emitter-collector path of a first transistor in series with the supply source and the load. The phase-reversing current amplifier comprising a second transistor is provided for controlling the current in the emitter-base path of the first transistor to thereby control the current flowing through the emitter-collector path of the first transistor to the load. The sum of the emitter-collector currents of a third and fourth transistor which are energized from the load circuit is supplied to a resistor connected in the base path of the second transistor to thereby control the current flowing through the collector-emitter path of the second transistor and the base-emitter path of the first transistor in series.

There is impressed upon the emitter-base path of the third transistor a control voltage equal to the difference of a substantially constant voltage and a portion at least of the load voltage. There is impressed upon the emitter-base path of the fourth transistor a control voltage equal to the difference of a substantially constant voltage and a voltage proportional to the load current. When the load current is within a predetermined operating range, the emitter-base voltage of the fourth transistor has a polarity to cause its collector current to be reduced to a minimum value, that is, the fourth transistor is cut off. The circuit then operates to control the resistance of the emitter-collector path of the first transistor in response to load voltage changes to minimize changes of load voltage. When the load current increases to a certain amplitude above the predetermined operating range of load current, the collector current of the fourth transistor increases to cause the resistance of the collector-emitter path of the first transistor to increase and thereby reduce the load voltage. When the load voltage has been reduced sufficiently, the collector current of the third transistor is reduced to a minimum value, that is, the third transistor is cut off. For this condition, the circuit operates in response to load current changes to minimize changes of load current.

The invention will now be described in greater detail with reference to the accompanying drawing in which:

Fig. 1 is a schematic view of a current supply circuit embodying the invention; and Fig. 2 is a schematic view of a modification of the current supply circuit shown in Fig. 1.

Referring now to Fig. 1 of the drawing, there is provided a rectifier and filter 10 for supplying direct-current to a load circuit comprising a load 11 which may vary, the rectifier 10 being energized from an alternating-current supply source 12. There is provided for regulating the load voltage and load current a circuit comprising four p-n-p type transistors 13, 14, 15, and 16, each having an emitter, a collector, and a base, two p-n junction constant voltage diodes 17 and 18, resistors 19, 20, 21, 23, and 24 and potentiometers 22 and 25.

The load current flows from a positive grounded terminal of rectifier 10 through the load 11 and resistor 24 in series, into the emitter and out of the collector of transistor 13 to the negative output terminal of rectifier 10. The base of transistor 13 is connected to the emitter of transistor 14. The collector of transistor 14 is connected to the negative output terminal of rectifier 10. The resistor 19 is provided in a path connecting the base of transistor 14 to the negative output terminal of rectifier 10. It is thus seen that a portion of the load current which flows into the emitter of transistor 13 flows out of its base and into the emitter of transistor 14. A portion of the emitter current of transistor 14 flows out of its collector to the negative terminal of rectifier 10 and the remaining portion flows out of its base and through resistor 19 to the negative terminal of rectifier 10.

The collectors of transistors 15 and 16, respectively, are connected to the base of transistor 14. Constant voltage diode 17, resistor 20 and constant voltage diode 18 are provided in series and in order in a shunt current path connected from ground to the common terminal of resistor 24 and the emitter of transistor 13. The emitter of transistor 15 is connected to the common terminal of diode 17 and resistor 20. A shunt current path across the load 11 comprises in series the resistor 21, potentiometer 22, and resistor 23. The base of transistor 15 is connected to the variable tap of potentiometer 22. The emitter of transistor 16 is connected to the negative load terminal. Potentiometer 25 is connected across the constant voltage diode 18 and the variable tap of potentiometer 25 is connected to the base of transistor 16.

There is thus impressed across the emitter-base path of transistor 15 a voltage equal to the difference of the substantially constant voltage across the diode 17 and that portion of the load voltage between the positive load terminal and the variable tap of potentiometer 22. The voltage impressed across the emitter-base path of transistor 16 is equal to the difference of the voltage drop across resistor 24 and that portion of the substantially constant voltage across diode 18 between the common terminal of resistor 24 and potentiometer 25 and the variable tap of potentiometer 25.

Consider first that the resistance of the load 11 is relatively high and that the load current, therefore, is relatively low. Under this condition the voltage across resistor 24 is less than the opposing voltage across a portion of potentiometer 25 in the emitter-base circuit of transistor 16. Therefore, a minimum current flows out of the collector of transistor 16 and through resistor 19 to the negative terminal of rectifier 10. If the load voltage should increase, due to an increase of the voltage of the source 12, for example, the base of transistor 15 would become relatively more negative with respect to its emitter potential to cause the current flowing out of the collector of transistor 15 and through resistor 19 to increase. As a result, the currents flowing through the emitter-base paths and the emitter-collector paths of transistors 13 and 14 decrease. That is, the resistance of the emitter-collector path of transistor 13 and the voltage drop across this path increase to cause the assumed increase of load voltage to be minimized.

The regulating circuit also functions to minimize changes of load voltage caused by changes of load current over a predetermined normal operating range of load current. If the resistance of the load is decreased to cause an increase of load current, for example, the voltage drop in the load circuit, the voltage drop across resistor 24, for example, increases to cause the load voltage to decrease. As a result, the base of transistor 15 becomes relatively less negative with respect to its emitter potential to cause a decrease of the current flowing from the collector of transistor 15 through resistor 19. The resistance of the emitter-collector path of transistor 13 is thus reduced to thereby cause the decrease of load voltage to be minimized.

The load voltage over the normal operating range of load current may be increased or decreased by changing the setting of the variable tap of potentiometer 22. For example, moving the tap of potentiometer 22 so as to make its potential relatively more negative will cause an increase of the current flowing through the resistor 19, thereby increasing the voltage drop across the emitter-collector path of transistor 13 and reducing the load voltage.

When the resistance of the load is decreased sufficiently to cause the load current to increase to an amplitude above the predetermined normal operating range of load current, the voltage drop across resistor 24 becomes larger than the voltage across the portion of potentiometer 25 which is in the emitter-base path of transistor 16 in series opposition to the voltage across resistor 24. Under this condition, an increase of load current causes an increase of current flowing into the emitter and out of the collector of transistor 16 and through resistor 19 to the negative terminal of rectifier 10. The resistance of the emitter-collector path of transistor 13 is thus increased to limit the increase of load current and to cause the load voltage to decrease. The decrease of load voltage will result in a decrease of collector current of transistor 15. When the load resistance is sufficiently decreased and the load current reaches a certain amplitude, the collector current of transistor 15 will be at a minimum amplitude. As the load voltage is further reduced, the transistor 15 can not control the current through resistor 19 and the resistance of the emitter-collector path of transistor 13. Under this condition of relatively high load current, when the load current increases, for example, the regulating circuit comprising transistors 16, 14 and 13 operates to minimize the increase of load current.

The maximum amplitude of the load current range for which the load voltage is maintained substantially constant may be increased or decreased by adjusting the setting of the variable tap of potentiometer 25. For example, moving the tap of potentiometer 25 toward the common terminal of resistor 24 and potentiometer 25 will lower the maximum amplitude of the normal operating range of load current.

The current supply circuit of Fig. 2 is similar to the current supply circuit of Fig. 1, the corresponding parts of the two circuits being designated by the same reference numerals, but the transistors 13, 14, 15 and 16 are n–p–n type transistors in Fig. 2. In Fig. 2 the negative output terminal of rectifier 10 is grounded, the emitter-collector path of transistor 13 and resistor 24 are connected in series in the path connecting the positive output terminal of rectifier 10 to the positive load terminal and the positions of diode 17 and 18 are reversed with respect to their position in the circuit of Fig. 1. In Fig. 2, current flows from the positive output terminal of rectifier 10 through the collector-emitter path of transistor 13, through the resistor 24 and the load 11 to the grounded negative terminal of rectifier 10. The circuit functions similarly to the circuit of Fig. 1 to maintain the load voltage substantially constant over a predetermined operating range of load current and to limit the load current when it increases above the normal operating range.

If desired, the constant voltage diodes 17 and 18 may be connected in separate shunt current paths across the load circuit. In Fig. 1, for example, the common terminal of diode 18 and potentiometer 25 may be disconnected from resistor 20 and this terminal of resistor 20 connected to the negative terminal of load 11. The common terminal of potentiometer 25 and diode 18 which has been disconnected is then connected through an additional resistor not shown to the grounded terminal of rectifier 10.

What is claimed is:

1. Apparatus for supplying current from a direct-current supply source to a load circuit including a load comprising a first and a second transistor each having emitter, collector and base electrodes, a resistor, means for controlling the current supplied to said load in response to the current supplied to said resistor, means for supplying currents from said load circuit through the emitter-collector paths of said transistors respectively to said resistor, means for deriving from said load circuit a first and a second substantially constant voltage, means for impressing upon the emitter-base path of said first transistor a voltage equal to the difference of a portion at least of the load voltage and said first constant voltage, and means for impressing upon the emitter-base path of said second transistor a voltage equal to the difference of a voltage proportional to the load current and said second constant voltage.

2. Apparatus for supplying current from a direct-current supply source to a load circuit including a load, comprising a first, a second, a third, and a fourth transistor each having an emitter, a collector, and a base, a first resistor having a first, and a second terminal connected in series in said load circuit, means for connecting the emitter-collector path of said first transistor in series with said first resistor in said load circuit, means for connecting the base of said first transistor to the emitter of said second transistor, means for connecting the collector of said first transistor to the collector of said second transistor, a second resistor in a path connecting the base of said second transistor to the collectors of said first and second transistors, a shunt current path across said load circuit comprising in series and in order a first constant voltage device, a third resistor and a second constant voltage device, a first terminal of said first resistor being connected to a terminal of said second constant voltage device, a first voltage dividing resistance path connected across said load, means for connecting the base of said third transistor to said first voltage dividing path, means for connecting the emitter of said third transistor to the common terminal of said first constant voltage device and said third resistor, means for connecting the collector of said third transistor to the base of said second transistor, means for connecting the collector of said fourth transistor to the base of said second transistor, a second voltage dividing resistance path connected across said second constant voltage device, means for connecting the base of said fourth transistor to said second voltage dividing path and means for connecting the emitter of said fourth transistor to said second terminal of said first resistor.

3. Apparatus for supplying current from a current supply source to a load circuit including a load comprising a first and a second transistor each having an emitter, a collector and a base, a resistor, a first and a second current path for supplying current from said source to said resistor, said first and second current paths comprising the emitter-collector paths of said first and second transistors respectively, means for deriving from said load circuit and impressing upon the emitter-base paths of said first and second transistors a first and a second control voltage respectively, and means responsive to the current supplied to said resistor for controlling the current supplied to said load.

4. Apparatus for supplying current from a current supply source to a load comprising a first, a second, and a third transistor each having an emitter, a collector and a base, means for connecting the emitter-collector path of said first transistor in series with said supply source and said load, means for impressing upon the emitter-base path of said second transistor a voltage which varies in accordance with load voltage changes to control a first current supplied from said source through the emitter-collector path of said second transistor, means for impressing upon the emitter-base path of said third transistor a voltage which varies in accordance with load current changes to control a second current supplied from said source through the emitter-collector path of said third transistor, and means responsive to the sum of said first and second currents for controlling the resistance of the emitter-collector path of said first transistor.

References Cited in the file of this patent

UNITED STATES PATENTS

| | | |
|---|---|---|
| 2,210,393 | Braden | Aug. 6, 1940 |
| 2,693,568 | Chase | Nov. 2, 1954 |
| 2,697,811 | Deming | Dec. 21, 1954 |
| 2,767,330 | Marshall | Oct. 16, 1956 |
| 2,832,900 | Ford | Apr. 29, 1958 |

Notice of Adverse Decision in Interference

In Interference No. 91,289 involving Patent No. 2,904,742, F. H. Chase, Current supply apparatus, final judgment adverse to the patentee was rendered Aug. 7, 1962, as to claims 3 and 4.

[*Official Gazette September 18, 1962.*]